US012386124B2

(12) United States Patent
Rokach et al.

(10) Patent No.: US 12,386,124 B2
(45) Date of Patent: Aug. 12, 2025

(54) DEVICE FOR HOLDING A PLURALITY OF FERRULES AGAINST A RESPECTIVE PLURALITY OF RECEPTACLES

(71) Applicant: Mellanox Technologies, Ltd., Yokneam (IL)

(72) Inventors: Alon Rokach, Yokneam (IL); Aziz Mazbar, Yokneam (IL); Nimer Hazin, Yokneam (IL); Hen Seri, Yokneam (IL); Samer Yasin, Yokneam (IL)

(73) Assignee: Mellanox Technologies, Ltd., Yokneam (IL)

( * ) Notice: Subject to any disclaimer, the term of this patent is extended or adjusted under 35 U.S.C. 154(b) by 318 days.

(21) Appl. No.: 18/072,134

(22) Filed: Nov. 30, 2022

(65) Prior Publication Data

US 2024/0176078 A1    May 30, 2024

(51) Int. Cl.
*G02B 6/38* (2006.01)
*G02B 6/42* (2006.01)

(52) U.S. Cl.
CPC ......... *G02B 6/3869* (2013.01); *G02B 6/3878* (2013.01); *G02B 6/3879* (2013.01); *G02B 6/3885* (2013.01); *G02B 6/4292* (2013.01); *G02B 6/4246* (2013.01)

(58) Field of Classification Search
CPC .. G02B 6/3869; G02B 6/3879; G02B 6/3881; G02B 6/3885; G02B 6/4246; G02B 6/4292; G02B 6/3878; H01R 13/518; H01R 13/6273
USPC .................................................... 385/53, 65
See application file for complete search history.

(56) References Cited

U.S. PATENT DOCUMENTS

| | | | |
|---|---|---|---|
| 4,759,600 A | 7/1988 | Caron et al. | |
| 4,798,440 A * | 1/1989 | Hoffer | G02B 6/4246 385/88 |
| 4,836,636 A | 6/1989 | Obara et al. | |
| 5,048,916 A | 9/1991 | Caron | |

(Continued)

FOREIGN PATENT DOCUMENTS

| | | | |
|---|---|---|---|
| AU | 2013290212 A1 * | 1/2015 | ............. F16B 17/00 |
| CN | 105676372 | 6/2016 | |

(Continued)

*Primary Examiner* — Uyen N Le
*Assistant Examiner* — Darby M. Thomason
(74) *Attorney, Agent, or Firm* — PEARL COHEN ZEDEK LATZER BARATZ LLP

(57) ABSTRACT

A device for holding a plurality of ferrules securely against a respective plurality of receptacles, which may include: a frame including: a transverse portion arranged in a transverse direction, a first longitudinal portion projecting from a first edge of the transverse portion and a second longitudinal portion projecting from a second edge of the transverse portion opposite to the first edge of the transverse portion, wherein the first and the second longitudinal portions project from the respective edges of the transverse portion in a longitudinal direction that is substantially perpendicular to the transverse direction; and a holder coupled between the first and second longitudinal portions of the frame, the holder being configured to hold, with respect to the frame, a plurality of ferrules arranged longitudinally parallel to each other and being distanced from each other in the transverse direction.

19 Claims, 7 Drawing Sheets

(56) References Cited

U.S. PATENT DOCUMENTS

| | | | | |
|---|---|---|---|---|
| 5,285,510 | A * | 2/1994 | Slaney | G02B 6/3821 |
| | | | | 385/60 |
| 5,398,295 | A * | 3/1995 | Chang | G02B 6/3879 |
| | | | | 385/58 |
| 6,234,682 | B1 * | 5/2001 | Nagaoka | G02B 6/3878 |
| | | | | 385/59 |
| 6,371,657 | B1 * | 4/2002 | Chen | G02B 6/3879 |
| | | | | 385/139 |
| 7,744,288 | B2 * | 6/2010 | Lu | G02B 6/3887 |
| | | | | 385/60 |
| 9,033,591 | B2 * | 5/2015 | Hikosaka | G02B 6/38875 |
| | | | | 385/76 |
| 9,360,640 | B2 | 6/2016 | Ishigami et al. | |
| 2002/0076165 | A1 * | 6/2002 | Childers | G02B 6/3869 |
| | | | | 385/77 |
| 2010/0008630 | A1 | 1/2010 | Marrapode et al. | |
| 2014/0328559 | A1 | 11/2014 | Kobayashi et al. | |
| 2015/0185423 | A1 * | 7/2015 | Matsui | G02B 6/4292 |
| | | | | 385/77 |
| 2017/0227718 | A1 * | 8/2017 | Akieda | G02B 6/3825 |
| 2019/0278027 | A1 * | 9/2019 | Stone | G02B 6/387 |
| 2021/0109297 | A1 | 4/2021 | Chen et al. | |

FOREIGN PATENT DOCUMENTS

| | | | |
|---|---|---|---|
| JP | S 5952210 | | 3/1984 |
| JP | H0320311 U | * | 2/1991 |
| JP | H06201951 A | * | 11/1993 |
| JP | 2543360 B2 | * | 10/1996 |

\* cited by examiner

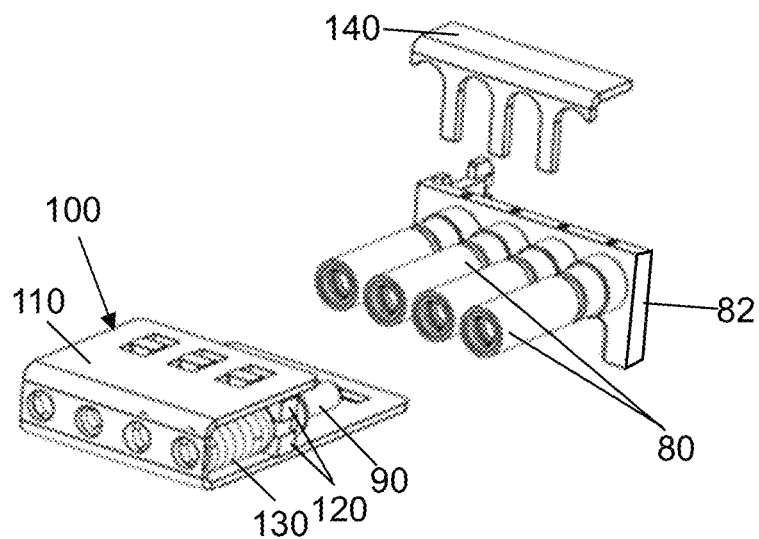
Fig. 1D(i)
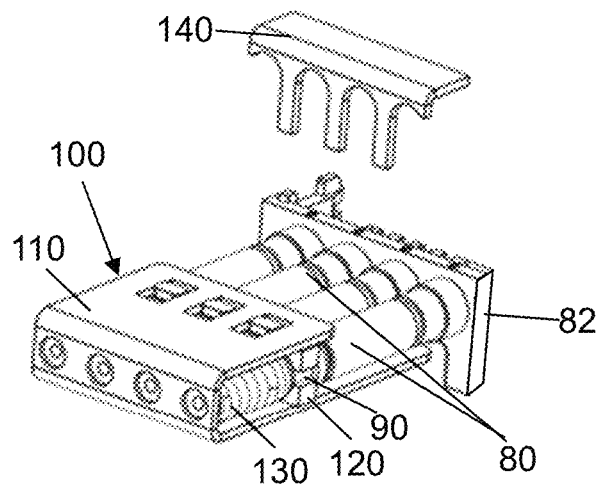
Fig. 1D(ii)
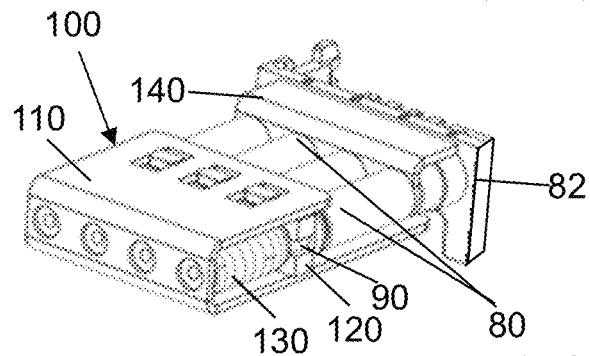
Fig. 1D(iii)

DEVICE FOR HOLDING A PLURALITY OF FERRULES AGAINST A RESPECTIVE PLURALITY OF RECEPTACLES

FIELD OF THE INVENTION

The present invention relates to the field of connectors for optical transceivers and, more particularly, to devices for holding ferrules against receptacles.

BACKGROUND OF THE INVENTION

Typically, a network interface device, e.g., a form-factor pluggable device, includes an optical transceiver disposed on a printed circuit board of the network interface device. The optical transceiver typically includes a plurality of receptacles configured to receive a respective plurality of ferrules carrying a respective plurality of optical cables. In order for the ferrules to be held against the receptacles, glue is typically applied at the interface between the receptacles and the ferrules during the assembly of the network interface device. However, the glue cannot ensure proper position of the ferrules with respect to the receptacles. For example, if one of the ferrules is improperly inserted into the respective receptacle, the glue, after curing and hardening, may hold the ferrule against the receptacle in this improper position and may thus cause improper coupling between the ferrule and the receptacle. Moreover, the glue may shrink during curing and hardening thereof (e.g., due to its shrinkage (e.g., linear shrinkage) properties), thus causing displacement (e.g., displacement of a few microns) and, as a result, improper positioning and coupling of the ferrules with respect to the receptacles. Furthermore, utilization of glue for holding the ferrules against the receptacles may require rework and/or replacement of the ferrules and/or the receptacles, e.g., due to high coupling loss, bending and/or breakage of ferrules and/or receptacles during the assembly process. Also, once the glue is cured, it may be difficult to remove the glue and/or to rework the glued ferrules and receptacles as this rework may cause damage to sensitive components of ferrules and/or receptacles.

SUMMARY OF THE INVENTION

Some embodiments of the present invention may provide a device for holding a plurality of ferrules securely against a respective plurality of receptacles, which may include: a frame including: a transverse portion arranged in a transverse direction, a first longitudinal portion projecting from a first edge of the transverse portion, and a second longitudinal portion projecting from a second edge of the transverse portion opposite to the first edge of the transverse portion, wherein the first and the second longitudinal portions project from the respective edges of the transverse portion in a longitudinal direction that is substantially perpendicular to the transverse direction; and a holder coupled between the first and second longitudinal portions of the frame, the holder being configured to hold, with respect to the frame, a plurality of ferrules arranged longitudinally parallel to each other and being distanced from each other in the transverse direction.

Some embodiments of the present invention may provide an assembly that may include: a frame including: a transverse portion arranged in a transverse direction, a first longitudinal portion projecting from a first edge of the transverse portion, and a second longitudinal portion projecting from a second edge of the transverse portion opposite to the first edge of the transverse portion, wherein the first and the second longitudinal portions project from the respective edges of the transverse portion in a longitudinal direction that is substantially perpendicular to the transverse direction; a plurality of ferrules arranged longitudinally parallel to each other and being distanced from each other in the transverse direction; a holder coupled between the first and second longitudinal portions of the frame and holding the plurality of parallel ferrules with respect to the frame; and a plurality of spring elements, each spring element pushing a respective one of the plurality of ferrules against the transverse portion in the longitudinal direction.

BRIEF DESCRIPTION OF THE DRAWINGS

For a better understanding of embodiments of the invention and in order to show how the same can be carried into effect, reference is made, purely by way of example, to the accompanying drawings in which like numerals designate corresponding elements or sections throughout and in which:

FIGS. 1D(i), 1D(ii) and 1D(iii) show 3D illustrations of coupling of the plurality of ferrules to the respective plurality of receptacles using the device, according to some embodiments of the invention;

Figure 1A:
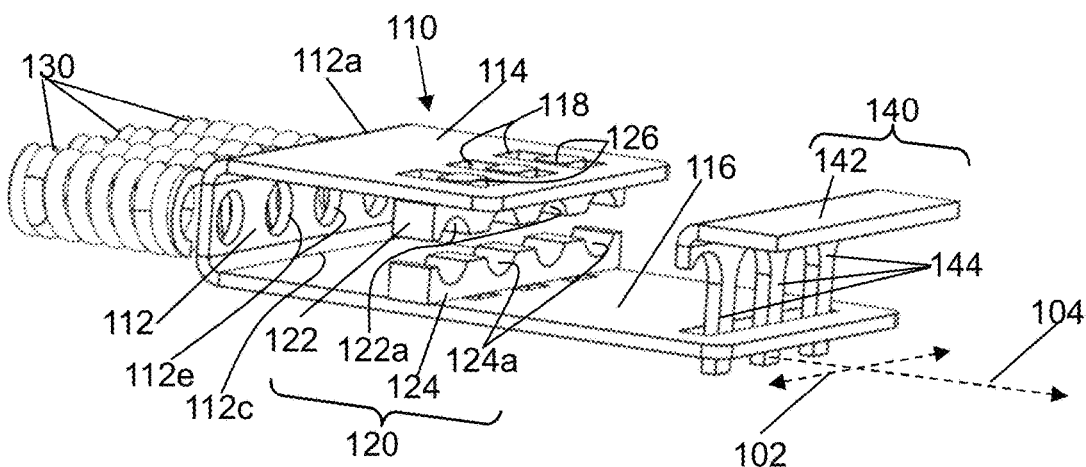
FIGS. 1A and 1B are 3D diagrams of a device for holding a plurality of ferrules against a respective plurality of receptacles, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features may have been omitted or simplified in order to not obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Some embodiments of the present invention may provide a device for holding a plurality of ferrules securely against a respective plurality of receptacles. The device may be used in a network interface device such as, for example, a small form factor pluggable device. The device may be used to hold a plurality of ferrules carrying a respective plurality of optical fibers securely against a respective plurality of receptacles of an optical transmitter, for example receptacles of a Transmitter Optical Sub-Assembly (TOSA) or Receiver Optical Sub-Assembly (ROSA) of the optical transmitter. The device may improve coupling of the plurality of ferrules to the respective plurality of receptacles. The device may be used to hold ferrules other than ferrules carrying optical fibers, in components other than optical transmitters and/or in devices other than network interface devices.

The device may include a frame. The frame may include a transverse portion arranged in a transverse direction, as well as a first longitudinal portion and a second longitudinal portion projecting from opposing edges of the transverse portion in a longitudinal direction that is substantially perpendicular to the transverse direction. The device may include a holder. The holder may be coupled between the first and second longitudinal portions of the frame. The holder may hold, with respect to the frame, a plurality of ferrules arranged longitudinally parallel to each other and being distanced from each other in the transverse direction. The device may include a plurality of springs. Each of the springs may push a respective one of the plurality of ferrules against the transverse portion of the frame in the longitudinal direction. The frame may engage with the receptacles so as to properly position and hold the frame and the ferrules with respect to the receptacles.

The device may allow easy coupling of the plurality of ferrules to the respective plurality of receptacles. The device may hold the ferrules arranged longitudinally parallel to each other such that, when the device is placed in front of the optical transmitter, each of the ferrules is aligned with the respective receptacle in the optical transmitter. The device may allow simultaneous insertion of all of the ferrules into the receptacles. The device may engage with the receptacles and may ensure proper positioning, coupling and holding of the ferrules with respect to the receptacles. The device may allow easily decoupling and recoupling of the ferrules and the receptacles if maintenance and/or rework and/or replacement of the ferrules and/or of the receptacles is required.

Figure 1B:
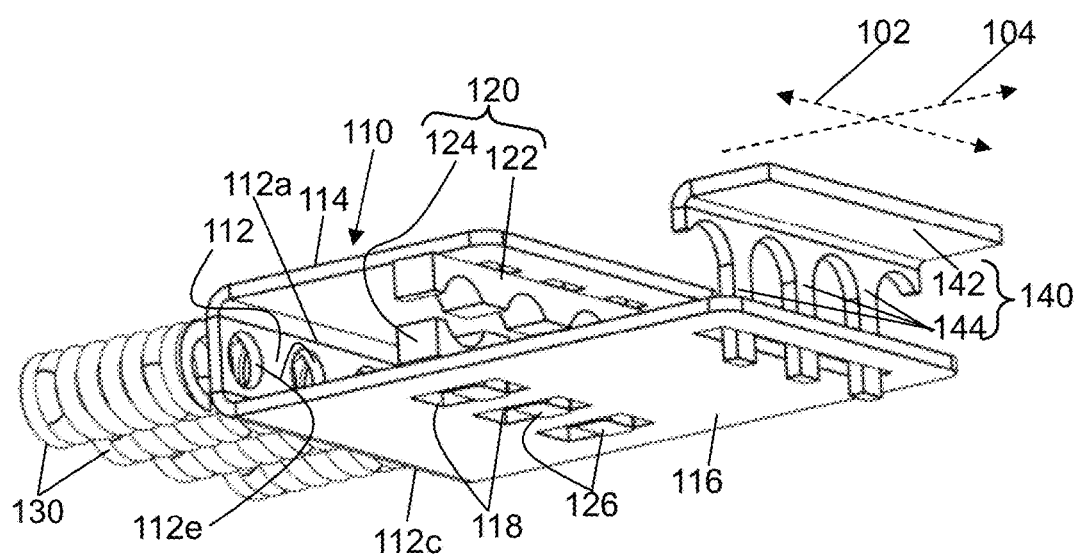

Reference is made to FIGS. 1A and 1B, which are 3D diagrams of a device 100 for holding a plurality of ferrules 90 against a respective plurality of receptacles 80, according to some embodiments of the invention. FIGS. 1A and 1B show different perspective views of device 100.

Figure 1C:
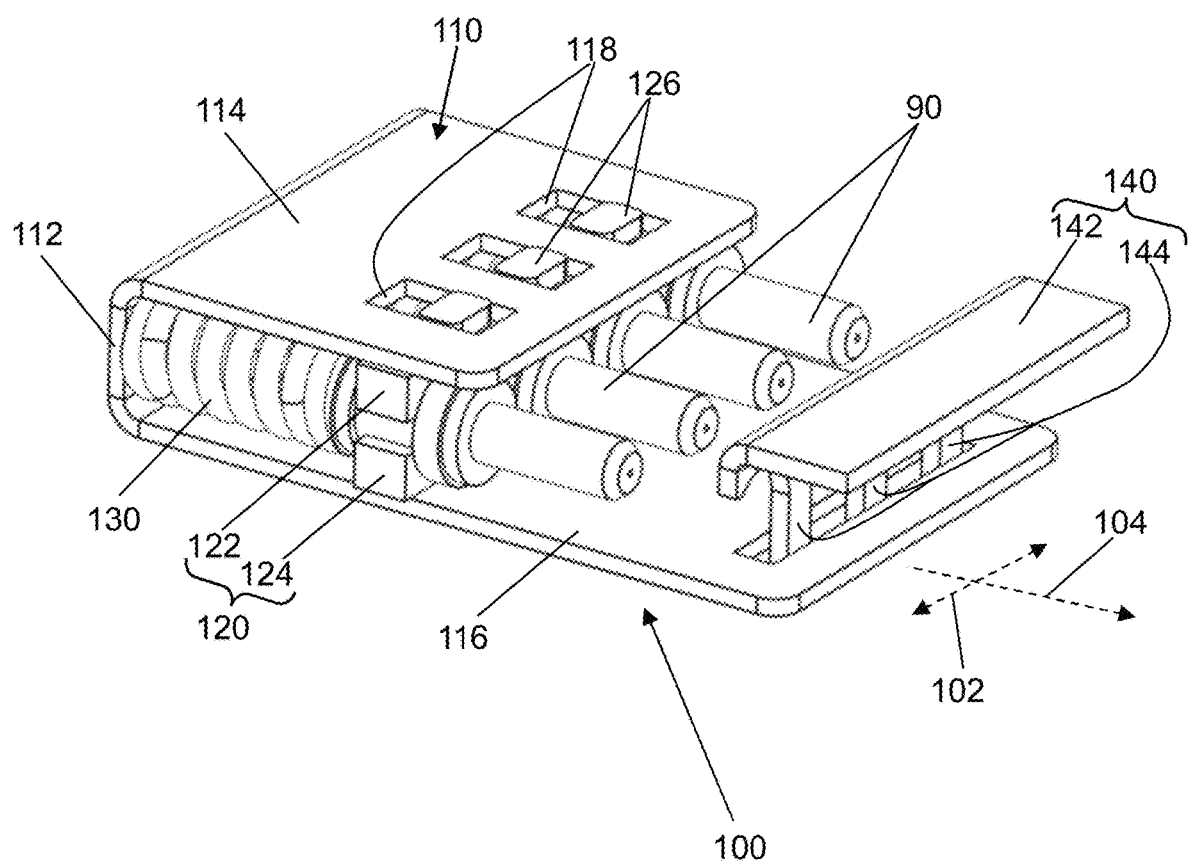
FIG. 1C is a 3D diagram of the device holding the plurality of ferrules, according to some embodiments of the invention.

Reference is also made to FIG. 1C, which is a 3D diagram of device 100 holding plurality of ferrules 90, according to some embodiments of the invention.

Reference is also made to FIGS. 1D(i), 1D(ii) and 1D(iii), which show 3D illustrations of coupling of plurality of ferrules 90 to respective plurality of receptacles 80 using device 100, according to some embodiments of the invention.

Device 100 may be used in a network interface device, such as, for example, small form factor pluggable device. Device 100 may be used to hold plurality of ferrules 90 carrying a respective plurality of optical fibers securely against respective plurality of receptacles 80 of an optical transmitter 82 (e.g., receptacles of Transmitter Optical Sub-Assembly (TOSA) or Receiver Optical Sub-Assembly (ROSA)). Device 100 may be used to hold ferrules other than ferrules carrying optical fibers, in components other than optical transmitters and/or in devices other than network interface devices.

Device 100 may include a frame 110. Frame 110 may include transverse portion 112 arranged in a transverse direction 102 of device 100. Frame 110 may also include a first longitudinal portion 114 and a second longitudinal portion 116, both projecting from transverse portion 112 in a longitudinal direction 104 of device 100 that is perpendicular (or substantially perpendicular) to transverse direction 102 of device 100. First longitudinal portion 114 may project from a first edge 112a of transverse portion 112. Second longitudinal portion 116 may project from a second edge 112c of transverse portion 112 that is opposite to first edge 112a of transverse portion 112. First longitudinal portion 114 and second longitudinal portion 116 may be parallel (or substantially parallel) to each other. Second longitudinal portion 116 may project from transverse portion 112 to a greater distance than first longitudinal portion 114 (e.g., as shown in FIGS. 1A, 1B, 1C and 1D(i)-1D(iii)). Transverse portion 112 of frame 110 may include a plurality of holes 112e (e.g., as shown in FIGS. 1A, 1B and 1D(i)-1D(iii)). Holes 112e may be distanced from each other in transverse direction 104. Each hole 112e may allow the passage of a cable therethrough for attachment to the respective ferrule 90. The cables are not shown in FIGS. 1A, 1B, 1C and 1D(i)-1D(iii) for simplicity. Transverse portion 112, first longitudinal portion 114 and second longitudinal portion 116 of frame 110 may be formed integrally from one piece of material (e.g., such as nickel, stainless steel or any other suitable material known in the art).

Device 100 may include a holder 120. Holder 120 may be coupled between first longitudinal portion 114 and second longitudinal portion 116 of frame 110 (e.g., as shown in FIGS. 1A, 1B, 1C and 1D(i)-1D(iii)). Holder 120 may hold, with respect to frame 110, plurality of ferrules 90 arranged longitudinally parallel to each other and being distanced from each other in transverse direction 102 (e.g., as shown in FIGS. 1C and 1D(i)-1D(iii)). Holder 120 may include a first holder member 122 and a second holder member 124 (e.g., as indicated in FIGS. 1A and 1B). Second holder member 124 may be opposed to first holder member 122 (e.g., as indicated in FIGS. 1A and 1B). First holder member 122 may include a plurality of concave indents 122a (e.g., as indicated in FIGS. 1A and 1B). Concave indents 122a of first holder member 122 may be distanced from each other in transverse direction 102. Second holder member 124 may include a plurality of concave indents 124a (e.g., as indicated in FIGS. 1A and 1B). Concave indents 124a of second holder member 124 may be distanced from each other in transverse direction 102. Each of concave indents 122a of first holder member 122 may be opposed to a respective one of concave indents 124a of second holder member 124 (e.g., as shown in FIGS. 1A, 1B and 1C) so as to hold one of plurality of ferrules 90 therebetween (e.g., as shown in FIG. 1C). Each pair of opposed concave indents 122a, 124a of first holder member 122 and of second holder member 124, respectively, may be aligned with one of holes 112e of transverse portion 112 of frame 110 (e.g., as shown in FIGS. 1A and 1B). Holder 120 may hold ferrules 90 with respect to frame 110 of device 100 arranged longitudinally parallel to each other and being distanced from each other in transverse direction 102 in a way that aligns each of ferrules 90 with the respective one of receptacles 80 of optical transmitter 82 when device 100 is placed in front of optical transmitter 82 (e.g., as shown in FIG. 1D(i)). Device 100 may thus allow easy and simultaneous coupling of plurality of ferrules 90 to the respective plurality of receptacles 80 (e.g., as shown in FIGS. 1D(i), 1D(ii) and 1D(iii)). Holder members 122, 124 may be formed of, for example, a plastic material such as polyetherimide or any other suitable material known in the art.

Frame 110 may allow a certain measure of movement of holder 120 with respect to frame 110 in longitudinal direction 104. Allowing the certain measure of movement of holder 120 with respect to frame 110 in longitudinal direction 104 may guarantee the matting between each of ferrules 90 and the respective receptacle, for example due to forces applied on the respective ferrule by a respective spring element 130 (e.g., as described hereinbelow). Frame 110 may prevent holder 120 from moving with respect to frame 110 in transverse direction 102. For example, each of first longitudinal portion 114 and second longitudinal portion 116 of frame 110 may include a plurality of grooves 118, each extending in longitudinal direction 104 (also referred herein as "longitudinal grooves 118"), and each of first holder member 122 and second holder member 124 may include a plurality of projections 126, each engaging with one of longitudinal grooves 118 of first longitudinal portion 114 and second longitudinal portion 116 of frame 110. Longitudinal grooves 118 of frame 110 may allow the certain measure of movement of holder 120 (e.g., holder members 122, 124) in longitudinal direction 104 with respect to frame 110 and may prevent holder 120 (e.g., holder members 122, 124) from moving in transverse direction 102 with respect to frame 110.

Device 100 may include a plurality of spring elements 130. Each of spring elements 130 may, for example, include a spring (e.g., coil spring; as shown in FIGS. 1A, 1B, 1C and 1D(i)-1D(iii)). Spring elements 130 may include components other than coil springs. For example, spring elements 130 may include foil springs, arc springs, leaf springs, balance springs or any other suitable spring elements known in the art. Each of spring elements 130 may push a respective one of plurality of ferrules 90 against transverse portion 112 of frame 110 in longitudinal direction 104 (e.g., as shown in FIGS. 1C and 1D(i)-1D(iii)). Each of spring elements 130 may be aligned with one of holes 112e of transverse portion 112 of frame 110 (e.g., as shown in FIGS. 1A, 1B and 1D(i)-1D(iii)).

Device 100 may include a locking member 140. Locking member 140 may engage with receptacles 80 and with second longitudinal portion 116 of frame 110 to lock frame 110 with respect to receptacles 80 and optical transmitter 82. For example, locking member 140 may include a base portion 142 and a plurality of projections 144 projecting from base portion 142 and being distanced from each other in transverse direction 102 along base portion 142. Locking member 140 may engage with receptacles 80 by holding each of receptacles 80 between two adjacent projections 144 of locking member 140 (e.g., as shown in FIG. 1D(iii)). Locking member 140 may engage with frame 110 by engaging projections 140 with a transverse groove 119 (e.g., groove extending in transverse direction 102) formed through second longitudinal portion 116 of frame 110 (e.g., as shown in FIGS. 1A, 1B, 1C and 1D(i)-1D(iii)).

When engaged with receptacles 80, device 100 may ensure proper positioning and coupling of ferrules 90 with respect to receptacles 80. For example, the length of second longitudinal portion 116 of frame 110, the position of transverse groove 119 with respect to second longitudinal portion 116 of frame 110 and/or any other suitable dimensions of any other suitable components of device 100 may be determined based on known dimensions of ferrules 90 and receptacles 80 in order to ensure proper positioning and coupling of ferrules 90 with respect to receptacles 80.

While in the example of FIGS. 1A, 1B, 1C and 1D(i)-1D(iii), device 100 holds four ferrules 90, it is noted that device 100 may hold any number of ferrules 90 (e.g., two, three or five and more ferrules 90).

Figure 2A:
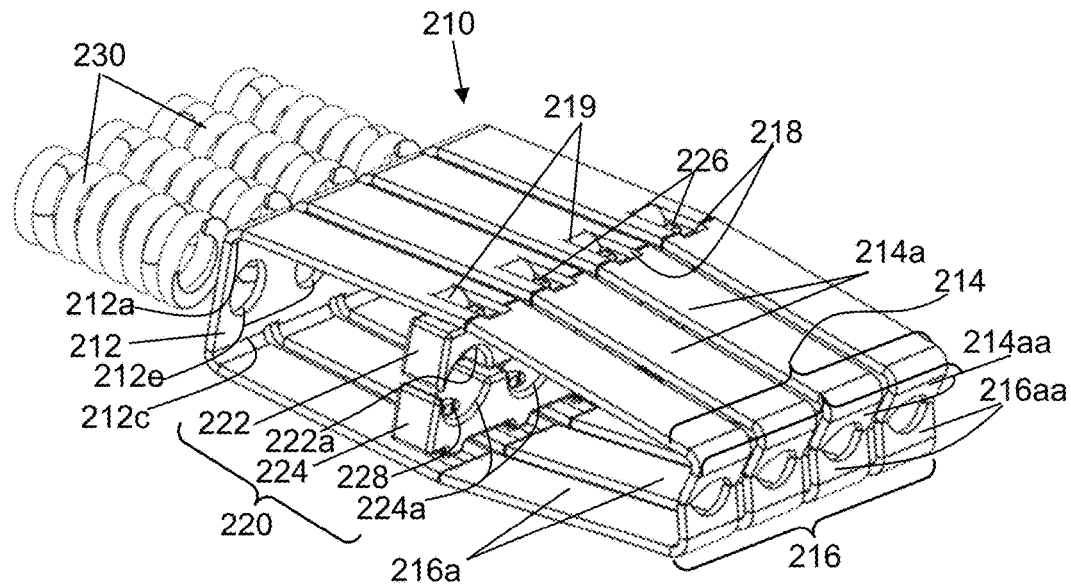
FIGS. 2A and 2B are 3D diagrams of a device for holding the plurality of ferrules against the respective plurality of receptacles, wherein the device includes a plurality of longitudinal members for engaging with the receptacles, according to some embodiments of the invention.
Figure 2B:
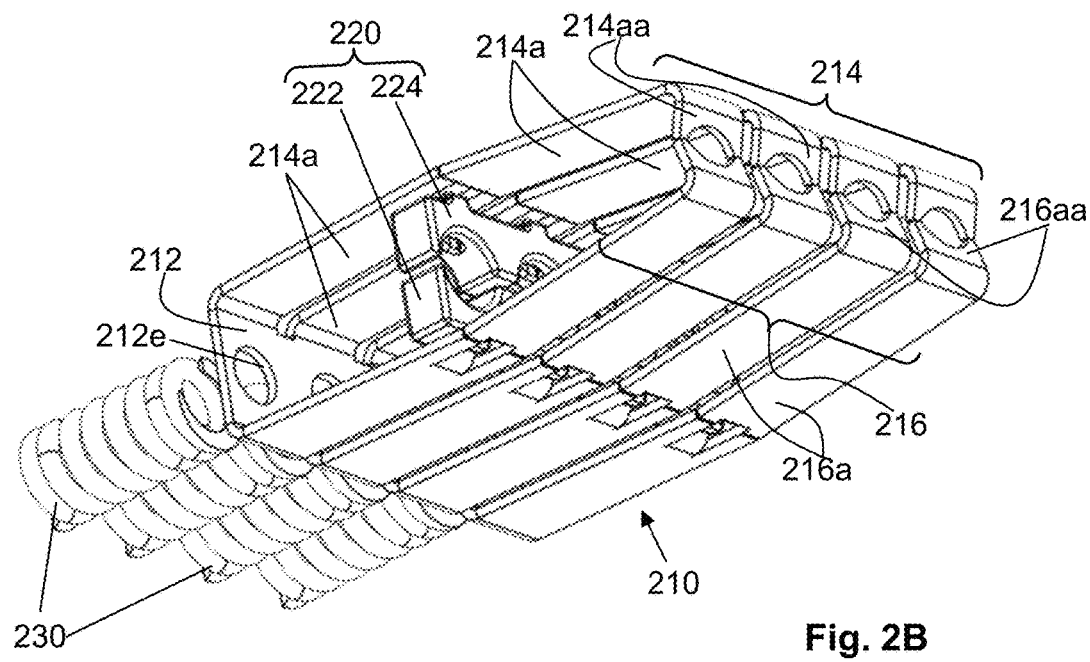

Reference is made to FIGS. 2A and 2B, which are 3D diagrams of a device 200 for holding plurality of ferrules 90 against respective plurality of receptacles 80, wherein device 200 includes a plurality of longitudinal members 214a, 216a for engaging with receptacles 80, according to some embodiments of the invention. FIGS. 2A and 2B show different perspective views of device 200.

Figure 2C:
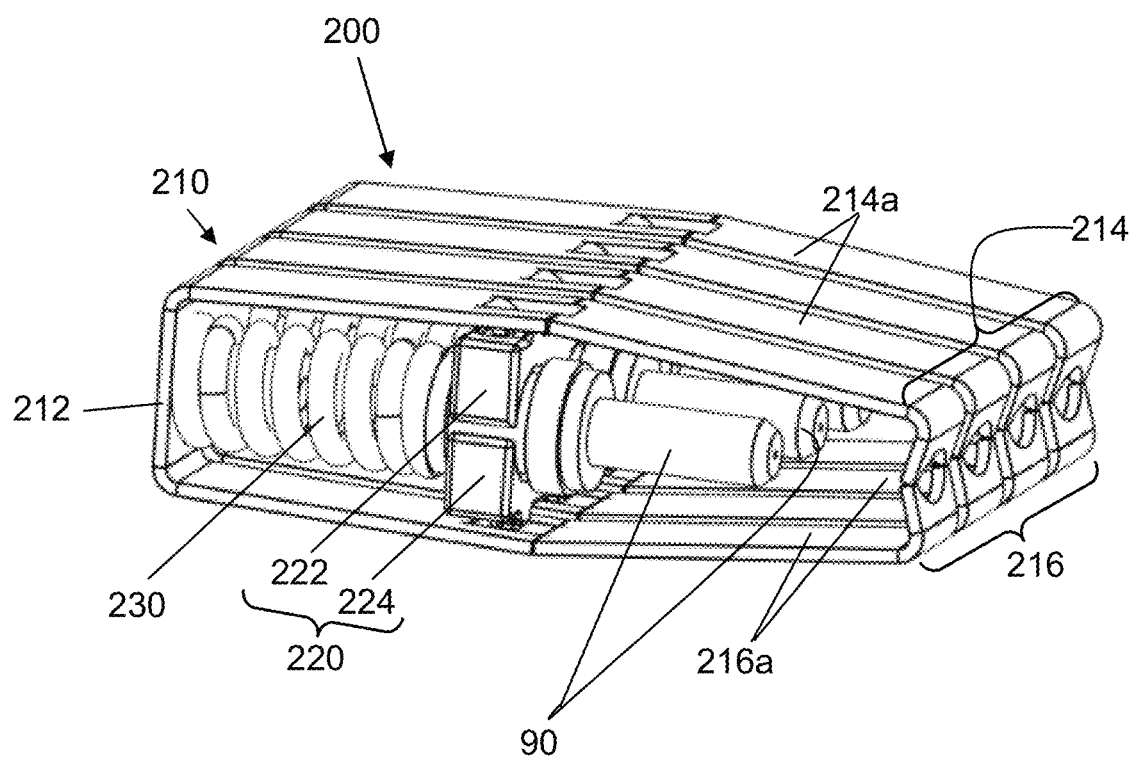
FIG. 2C is a 3D diagram of the device holding the plurality of ferrules, according to some embodiments of the invention.

Reference is also made to FIG. 2C, which is a 3D diagram of device 200 holding plurality of ferrules 90, according to some embodiments of the invention.

Figure 2D:
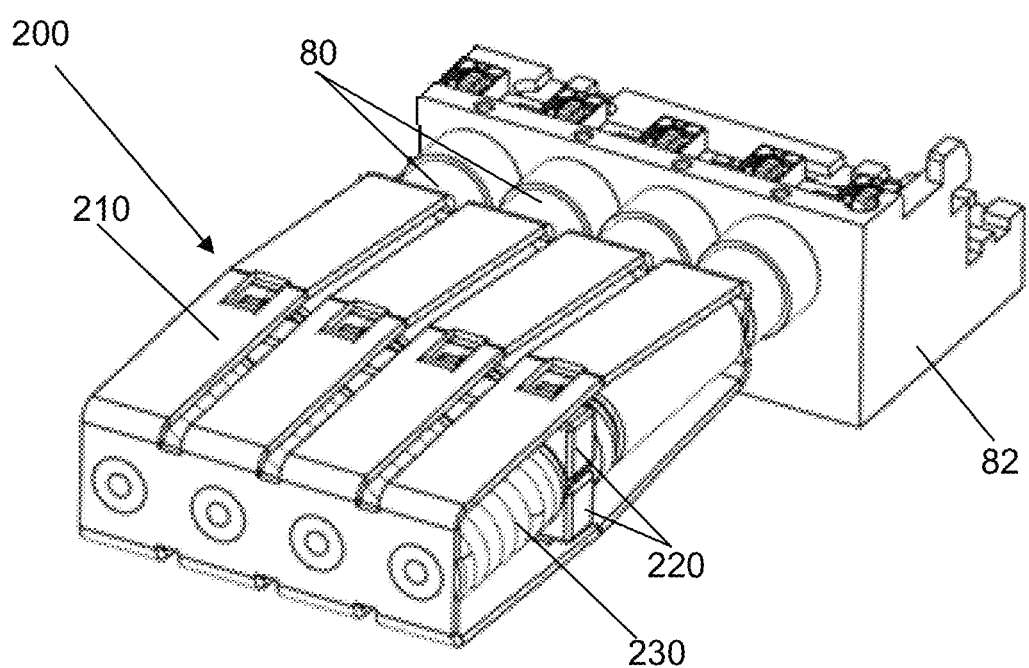
FIG. 2D is a 3D diagram of the device holding plurality of ferrules against the respective plurality of receptacles of an optical transmitter, according to some embodiments of the invention

Reference is also made to FIG. 2D, which is a 3D diagram of device 200 holding plurality of ferrules 90 against respective plurality of receptacles 80 of optical transmitter 82, according to some embodiments of the invention.

Device 200 may be used in a network interface device, such as, for example, small form factor pluggable device. Device 200 may be used to hold plurality of ferrules 90 carrying a respective plurality of optical fibers securely against respective plurality of receptacles 80 of an optical transmitter 82 (e.g., receptacles of TOSA or ROSA). Device 200 may be used to hold ferrules other than ferrules carrying optical fibers, in components other than optical transmitters and/or in devices other than network interface devices.

Device 200 may include a frame 210. Frame 210 may include transverse portion 212 arranged in a transverse direction 202 of device 200. Frame 210 may include a first longitudinal portion 214 and a second longitudinal portion 216, both projecting from transverse portion 212 in a longitudinal direction 204 of device 200 that is substantially perpendicular (or substantially perpendicular) to transverse direction 202 of device 200. First longitudinal portion 214 may project from a first edge 212a of transverse portion 212. Second longitudinal portion 216 may project from a second edge 212c of transverse portion 212 that is opposite to first edge 212a of transverse portion 212. Transverse portion 212, first longitudinal portion 214 and second longitudinal portion 216 of frame 210 may be formed integrally from one piece of material.

Transverse portion 212 of frame 210 may include a plurality of holes 212e (e.g., as shown in FIGS. 2A, 2B and 2D). Holes 212e may be distanced from each other in transverse direction 204. Each hole 212e may allow the passage of a cable therethrough for attachment to the respective ferrule 90. The cables are not shown in FIGS. 2A, 2B, 2C and 2D for simplicity.

First longitudinal portion 214 may include a plurality of longitudinal members 214a distanced from each other in transverse direction 202. Second longitudinal portion 216 may include a plurality of longitudinal members 216a distanced from each other in transverse direction 202. Each of the longitudinal members 214a of first longitudinal portion 214 may be opposed to a respective one of longitudinal members 216a of second longitudinal portion 216. Free ends 214aa of longitudinal members 214a of first longitudinal portion 214 and free ends 216aa of longitudinal members 216a of second longitudinal portion 216 of frame 210 may be curved inwardly so as to engage with receptacles 80 and hold frame 210 with respect to receptacles 80 and optical transmitter 82 (e.g., as shown in FIG. 2D).

Device 200 may include a holder 220. Holder 220 may be coupled between longitudinal members 214a of first longitudinal portion 214 and longitudinal members 216a of second longitudinal portion 216 of frame 210 (e.g., as shown in FIGS. 2A, 2B, 2C and 2D). Holder 220 may hold, with respect to frame 210, plurality of ferrules 90 arranged longitudinally parallel to each other and being distanced from each other in transverse direction 202 (e.g., as shown in FIGS. 2C and 2D). Holder 220 may include a first holder member 222 and a second holder member 224 (e.g., as indicated in FIGS. 2A and 2B). Second holder member 224 may be opposed to first holder member 222 (e.g., as indicated in FIGS. 2A and 2B). First holder member 222 may include a plurality of concave indents 222a (e.g., as indicated in FIG. 2A). Concave indents 222a of first holder member 222 may be distanced from each other in transverse direction 202. Second holder member 224 may include a plurality of concave indents 224a (e.g., as indicated in FIG. 2A). Concave indents 224a of second holder member 224 may be distanced from each other in transverse direction 202. Each of concave indents 222a of first holder member 222 may be opposed to a respective one of concave indents 224a of second holder member 224 (e.g., as shown in FIGS. 2A, 2B and 2C) so as to hold one of plurality of ferrules 90 therebetween (e.g., as shown in FIG. 2C). Each pair of opposed concave indents 222a, 224a of first holder member 222 and second holder member 224, respectively, may be aligned with one of holes 212e of transverse portion 212 of frame 210 (e.g., as shown in FIGS. 2A and 2B). Holder 220 may hold ferrules 90 with respect to frame 210 of device 200 arranged longitudinally parallel to each other and being distanced from each other in transverse direction 202 in a way that aligns each of ferrules 90 with the respective one of receptacles 80 of optical transmitter 82 when device 100 is placed in front of optical transmitter 82 (e.g., as described hereinabove). Device 200 may thus allow easy and simultaneous coupling of plurality of ferrules 90 to the respective plurality of receptacles 80 (e.g., as described hereinabove).

Frame 210 may prevent (or substantially prevent) movement of holder 220 (e.g., holder members 222, 224) with respect to frame 210 in transverse direction 202 and longitudinal direction 204. For example, each of holder members 222, 224 may include a plurality of projections 226, wherein each of projections 226 may engage with a respective one of grooves 218 formed on longitudinal members 214a, 216a of longitudinal portions 214, 216 of frame 210 (e.g., as indicated in FIG. 2A). Each of longitudinal members 214a, 216a of longitudinal portions 214, 216 of frame 210 may include a projection 219 that may engage with a respective one of a plurality of grooves 228 formed on holder members 222, 224 (e.g., as indicated in FIG. 2A).

Device 200 may include a plurality of spring elements 230. Each of spring elements 230 may, for example, include a spring (e.g., coil spring; as shown in FIGS. 2A, 2B, 2C and 2D) or any other suitable spring element known in the art. Each of spring elements 230 may push a respective one of plurality of ferrules 90 against transverse portion 212 of frame 210 in longitudinal direction 204 (e.g., as shown in FIGS. 2C and 2D). Each of spring elements 230 may be aligned with one of holes 212e of transverse portion 212 of frame 210 (e.g., as shown in FIGS. 2A, 2B and 2D).

When engaged with receptacles 80, device 200 may ensure proper positioning and coupling of ferrules 90 with respect to receptacles 80. For example, the length of longitudinal members 214a, 216a of longitudinal portions 214, 216 of frame 210 and/or any other suitable dimensions of any other suitable components of device 200 may be determined based on known dimensions of ferrules 90 and receptacles 80 to ensure proper positioning and coupling of ferrules 90 being held by device 200 with respect to receptacles 80.

While in the example of FIGS. 2A, 2B, 2C and 2D, device 200 holds four ferrules 90, it is noted that device 200 may hold any number of ferrules 90 (e.g., two, three or five and more ferrules 90).

Some embodiments of the present invention may provide an assembly including plurality of ferrules 90 and a device (e.g., such as device 100 or device 200 as described herein) holding the plurality of ferrules 90 arranged longitudinally parallel to each other and being distanced from each other in the transverse direction of the device (e.g., as shown in FIG. 1C and FIG. 2C).

Figure 3:
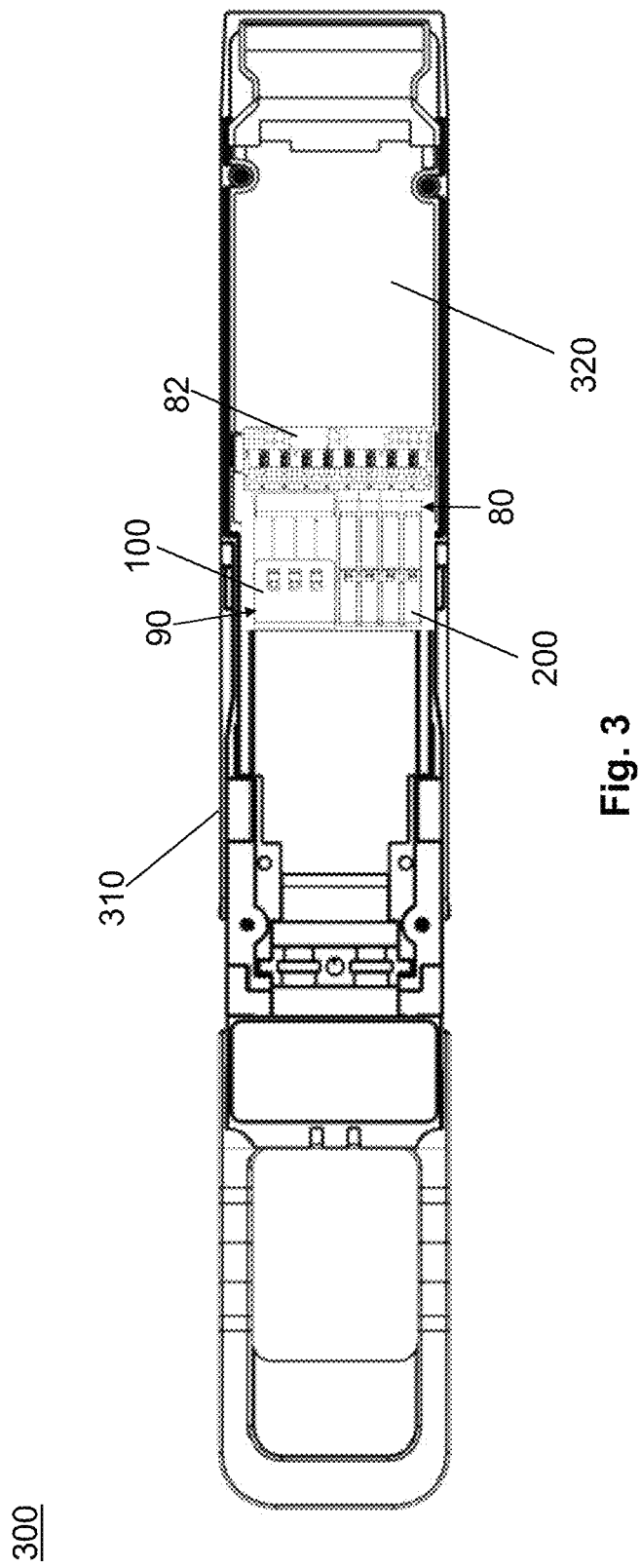
FIG. 3 is a schematic view of an electronic device including devices for holding the plurality of ferrules against the respective plurality of receptacles, according to some embodiments of the invention.

Reference is made to FIG. 3, which is a schematic view of an electronic device 300 including devices 100, 200 for holding plurality of ferrules 90 against respective plurality of receptacles 80, according to some embodiments of the invention.

Some embodiments of the present invention may provide an electronic device 300, such as network interface device (e.g., small form factor pluggable device). Electronic device 300 may include a shell 310, printed circuit board (PCB) 320, optical transmitter 82 disposed on PCB 320 and including a plurality of receptacles 80. Electronic device 300 may include one or more devices (e.g., such as device 100 or device 200 described herein) for holding a plurality of ferrules against the respective plurality of receptacles 80 of optical transmitter 80. In the example of FIG. 3, electronic device 300 includes device 100 that holds four ferrules 90 against respective four receptacles 80 of optical transmitter 82 and device 200 that holds another four ferrules 90 against respective another four receptacles 80 of optical transmitter 82. In some embodiments, electronic device 300 may include only one type of devices for holding a plurality of ferrules against the respective plurality of receptacles 80 of optical transmitter 82 (e.g., devices 100 or devices 200). In some embodiments, electronic device 300 may include one device (e.g., devices 100 or devices 200) for holding all ferrules 90 against all receptacles 80 of optical transmitter 82. In various embodiments, electronic device 300 may include more than two devices (e.g., of one or both types described herein) for holding ferrules 90 against receptacles 80 of optical transmitter 82. Any other suitable configurations are possible.

Disclosed devices 100, 200 may allow easy coupling of the plurality of ferrules 90 to the respective plurality of receptacles 80. Devices 100, 200 may hold ferrules 90 arranged longitudinally parallel to each other such that, when devices 100, 200 are placed in front of optical transmitter 82, each of ferrules 90 is aligned with respective receptacle 80 in optical transmitter 82. Devices 10, 200 may allow simultaneous insertion of all of ferrules 90 into receptacles 80. Devices 100, 200 may engage with receptacles 80 and may ensure proper positioning, coupling and holding of ferrules 90 with respect to receptacles 80. Devices 100, 200 may allow easily decoupling and recoupling of ferrules 90 and receptacles 80 if maintenance and/or rework and/or replacement of ferrules 90 and/or receptacles 80 is required.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A device for holding a plurality of ferrules securely against a respective plurality of receptacles, the device comprising:
    a frame comprising:
        a transverse portion arranged in a transverse direction, and
        a first longitudinal portion projecting from a first edge of the transverse portion and a second longitudinal portion projecting from a second edge of the transverse portion opposite to the first edge of the transverse portion,
        wherein the first and the second longitudinal portions project from the respective edges of the transverse portion in a longitudinal direction that is perpendicular to the transverse direction; and
    a holder coupled between the first and second longitudinal portions of the frame, the holder being configured to hold, with respect to the frame, a plurality of ferrules arranged longitudinally parallel to each other and being distanced from each other in the transverse direction;
    wherein the frame allows a certain measure of movement of the holder with respect to the frame in the longitudinal direction upon coupling of the holder within the frame.

2. The device of claim 1, wherein the holder comprises:
    a first holder member and a second holder member opposed to the first holder member,
    wherein each of the first and second holder members comprises a plurality of respective concave indents that are distanced from each other in the transverse direction; and
    wherein each of the concave indents of the first holder member is opposed to a respective one of the concave indents of the second holder member so as to hold one of the plurality of ferrules therebetween.

3. The device of claim 1, wherein the frame is configured to prevent the holder from moving in the transverse direction with respect to the frame.

4. The device of claim 1,
    wherein each of the first and second longitudinal portions comprises a plurality of longitudinal grooves, and
    wherein the holder comprises a plurality of projections each configured to engage with a respective one of the longitudinal grooves of the first and second longitudinal portions.

5. The device of claim 4, wherein the longitudinal grooves allow a certain measure of movement of the holder in the longitudinal direction with respect to the frame and prevent the holder from moving in the transverse direction with respect to the frame.

6. The device of claim 1, wherein the second longitudinal portion projects from the transverse portion to a greater distance than the first longitudinal portion.

7. The device of claim 6, further comprising a locking member configured to engage with the receptacles and with the second longitudinal portion of the frame so as to lock the frame with respect to the receptacles.

8. The device of claim 1,
    wherein each of the first and second longitudinal portions comprises a plurality of longitudinal members distanced from each other in the transverse direction, and
    wherein each of the longitudinal members of the first longitudinal portion is opposed to a respective one of the longitudinal members of the second longitudinal portion.

9. The device of claim 8, wherein free ends of the longitudinal members of the first and second longitudinal portions are curved inwardly so as to engage with the receptacles and hold the frame with respect to the receptacles.

10. The device of claim 1, wherein the transverse portion comprises a plurality of holes distanced from each other in the transverse direction, each hole being configured to allow the passage of a cable therethrough for attachment to a respective ferrule.

11. The device of claim 1, comprising a plurality of spring elements, each spring element being configured to push a respective one of the plurality of ferrules against the transverse portion in the longitudinal direction.

12. The device of claim 1, wherein the transverse portion, the first longitudinal portion and the second longitudinal portion of the frame are formed integrally from one piece of material.

13. The device of claim 1, wherein the plurality of ferrules is disposed between the first and second longitudinal portions of the frame when held by the holder.

14. An assembly comprising:
a frame comprising:
a transverse portion arranged in a transverse direction, and
a first longitudinal portion projecting from a first edge of the transverse portion and a second longitudinal portion projecting from a second edge of the transverse portion opposite to the first edge of the transverse portion,
wherein the first and the second longitudinal portions project from the respective edges of the transverse portion in a longitudinal direction that is substantially perpendicular to the transverse direction;
a plurality of ferrules arranged longitudinally parallel to each other and being distanced from each other in the transverse direction;
a holder coupled between the first and second longitudinal portions of the frame and holding the plurality of parallel ferrules with respect to the frame; and
a plurality of spring elements disposed between the transverse portion of the frame and the holder to push the holder and the plurality of ferrules against the transverse portion in the longitudinal direction.

15. The assembly of claim 14, wherein the frame is configured to allow a certain measure of movement of the holder with respect to the frame in the longitudinal direction and to prevent the holder from moving with respect to the frame in the transverse direction.

16. The assembly of claim 14,
wherein the second longitudinal portion projects from the transverse portion to a greater distance than the first longitudinal portion, and
wherein the device further comprises a locking member configured to engage with the receptacles and with the second longitudinal portion of the frame so as to lock the frame with respect to the receptacles.

17. The assembly of claim 14,
wherein each of the first and second longitudinal portions comprises a plurality of longitudinal members distanced from each other in the transverse direction,
wherein each of the longitudinal members of the first longitudinal portion is opposed to a respective one of the longitudinal members of the second longitudinal portion, and
wherein each of the ferrules is disposed between the respective opposing longitudinal members of the first and second longitudinal portions.

18. The assembly of claim 17, wherein free ends of the longitudinal members of the first and second longitudinal portions are curved inwardly so as to engage with the receptacles and hold the frame with respect to the receptacles.

19. The assembly of claim 14, wherein the transverse portion of the frame comprises a plurality of holes distanced from each other in the transverse direction, each hole being configured to allow the passage of a cable therethrough for attachment to a respective ferrule.

* * * * *